(12) United States Patent
Costa et al.

(10) Patent No.: US 10,099,710 B1
(45) Date of Patent: Oct. 16, 2018

(54) GARAGE CART ASSEMBLY

(71) Applicants: Felicia Costa, Niagara Falls (CA);
Dominic Biamonte, Niagara Falls (CA)

(72) Inventors: Felicia Costa, Niagara Falls (CA);
Dominic Biamonte, Niagara Falls (CA)

(*) Notice: Subject to any disclaimer, the term of this patent is extended or adjusted under 35 U.S.C. 154(b) by 0 days.

(21) Appl. No.: 15/635,722

(22) Filed: Jun. 28, 2017

(51) Int. Cl.
*B62B 3/02* (2006.01)
*B62B 1/00* (2006.01)
*B62B 1/26* (2006.01)

(52) U.S. Cl.
CPC .............. *B62B 1/002* (2013.01); *B62B 1/008* (2013.01); *B62B 1/26* (2013.01); *B62B 3/02* (2013.01); *B62B 2205/006* (2013.01); *B62B 2205/20* (2013.01)

(58) Field of Classification Search
CPC ........... B62B 1/002; B62B 3/08; B62B 3/104; B62B 5/0089
USPC .................. 280/79.5, 47.331, 47.18, 47.35
See application file for complete search history.

(56) References Cited

U.S. PATENT DOCUMENTS

| | | | | |
|---|---|---|---|---|
| 1,738,096 A * | 12/1929 | Cole | ............... | B62B 3/104 248/129 |
| 2,812,951 A * | 11/1957 | Hanson | ............... | B62B 5/0083 254/2 R |
| D198,621 S | 7/1964 | Juen | | |
| 3,233,764 A * | 2/1966 | Hinsch | ............... | B62B 1/264 280/47.24 |
| 3,377,085 A * | 4/1968 | Fralick | ............... | B60D 1/00 280/408 |
| 3,815,767 A * | 6/1974 | Lund | ............... | B62B 1/264 280/47.18 |
| 3,942,813 A * | 3/1976 | Dombroski | ............... | B62B 1/14 280/47.131 |
| 4,037,739 A * | 7/1977 | Lee | ............... | B62B 5/0083 414/385 |
| 4,113,214 A * | 9/1978 | Dubois | ............... | B62B 1/264 248/146 |
| 4,566,708 A * | 1/1986 | Specie | ............... | B62B 1/26 280/47.131 |
| D299,578 S | 1/1989 | Wilson | | |
| 4,821,903 A | 4/1989 | Hayes | | |
| 4,984,704 A * | 1/1991 | O'Malley | ............... | B62B 3/104 211/81 |
| 5,088,751 A * | 2/1992 | Zint | ............... | B62B 3/104 280/47.34 |
| 5,135,245 A * | 8/1992 | Pagone | ............... | B62B 3/10 220/23.4 |
| 5,356,163 A * | 10/1994 | Suggs, Sr. | ............... | B60B 29/002 280/47.24 |

(Continued)

FOREIGN PATENT DOCUMENTS

WO    WO9532135    11/1995

*Primary Examiner* — Jeffrey J Restifo

(57) ABSTRACT

A garbage cart assembly for includes a cart and a plurality of garbage containers that are positioned on the cart. The cart is selectively rolled along a support surface thereby facilitating the plurality of garbage containers to be transported along the support surface. A cage is coupled to the cart to inhibit the plurality of garbage containers from falling off of the cart. A dolly is provided and the dolly is selectively rolled along the support surface. The dolly is selectively and removably coupled to the cart thereby facilitating the cart to be urged along the support surface.

12 Claims, 5 Drawing Sheets

(56) References Cited

U.S. PATENT DOCUMENTS

| | | | | |
|---|---|---|---|---|
| 5,513,939 A | * | 5/1996 | Martin | B62B 1/14 280/47.24 |
| 5,678,976 A | * | 10/1997 | Rodriguez | B62B 1/264 414/448 |
| 5,820,143 A | * | 10/1998 | Rigo | B62B 1/18 280/47.19 |
| 6,024,374 A | * | 2/2000 | Friesen | B60D 1/06 280/47.27 |
| 6,071,061 A | * | 6/2000 | Monnin | B62B 1/04 242/597 |
| 6,082,755 A | * | 7/2000 | Topar | B60D 1/00 280/416.1 |
| 6,244,603 B1 | * | 6/2001 | Rizzardi | B60P 3/1033 114/344 |
| 6,309,167 B1 | * | 10/2001 | McPherrin | B60P 1/28 414/457 |
| 6,382,642 B1 | * | 5/2002 | Rainey | B62B 1/264 280/47.24 |
| 6,419,246 B1 | * | 7/2002 | Neal | B62B 5/0083 280/47.34 |
| 6,663,136 B2 | * | 12/2003 | Stevens | B60D 1/075 280/47.27 |
| 6,682,084 B2 | * | 1/2004 | Webster | B62D 61/12 16/406 |
| 6,695,325 B2 | * | 2/2004 | Carrillo | B62B 3/008 280/47.16 |
| 6,962,353 B1 | * | 11/2005 | Garcia | B62B 1/14 248/215 |
| 7,011,485 B2 | * | 3/2006 | Henry | B62B 3/001 280/47.12 |
| 7,036,832 B2 | * | 5/2006 | Gargaro | B62B 1/206 280/47.131 |
| 7,178,812 B1 | * | 2/2007 | Bryan | B62B 1/14 280/248 |
| 7,350,790 B1 | * | 4/2008 | Wilson | B60D 1/00 280/402 |
| 7,641,205 B2 | * | 1/2010 | Privette | B62B 5/0003 280/47.131 |
| 7,661,684 B2 | * | 2/2010 | Westrate | A01G 23/04 280/47.34 |
| 7,823,907 B1 | | 11/2010 | Coholan | |
| 7,845,670 B2 | * | 12/2010 | Oberg | B60D 1/66 280/47.24 |
| 7,866,679 B1 | * | 1/2011 | Leon | B62B 1/264 280/47.131 |
| 8,408,564 B2 | * | 4/2013 | Hutchinson | B62B 3/04 280/47.34 |
| 8,485,773 B2 | * | 7/2013 | Coats | B62B 1/06 280/47.3 |
| 8,517,401 B1 | * | 8/2013 | Horn | B62B 5/0089 280/47.15 |
| 8,534,681 B2 | * | 9/2013 | Tomsha | B62B 1/18 280/47.131 |
| 8,973,927 B2 | * | 3/2015 | Belanger | B62B 3/0643 280/47.17 |
| 9,033,347 B1 | * | 5/2015 | Westrate | B62B 3/02 280/47.12 |
| 9,216,750 B2 | * | 12/2015 | Sindlinger | A01K 1/0035 |
| 9,452,767 B2 | * | 9/2016 | Falcaro | B62B 1/20 |
| 2008/0251773 A1 | * | 10/2008 | Smeeton | B66F 3/005 254/113 |

* cited by examiner

GARAGE CART ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to cart devices and more particularly pertains to a new cart device for storing and simultaneously transporting a plurality of garbage containers.

BRIEF SUMMARY OF THE INVENTION

An embodiment of the disclosure meets the needs presented above by generally comprising a cart and a plurality of garbage containers that are positioned on the cart. The cart is selectively rolled along a support surface thereby facilitating the plurality of garbage containers to be transported along the support surface. A cage is coupled to the cart to inhibit the plurality of garbage containers from falling off of the cart. A dolly is provided and the dolly is selectively rolled along the support surface. The dolly is selectively and removably coupled to the cart thereby facilitating the cart to be urged along the support surface.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
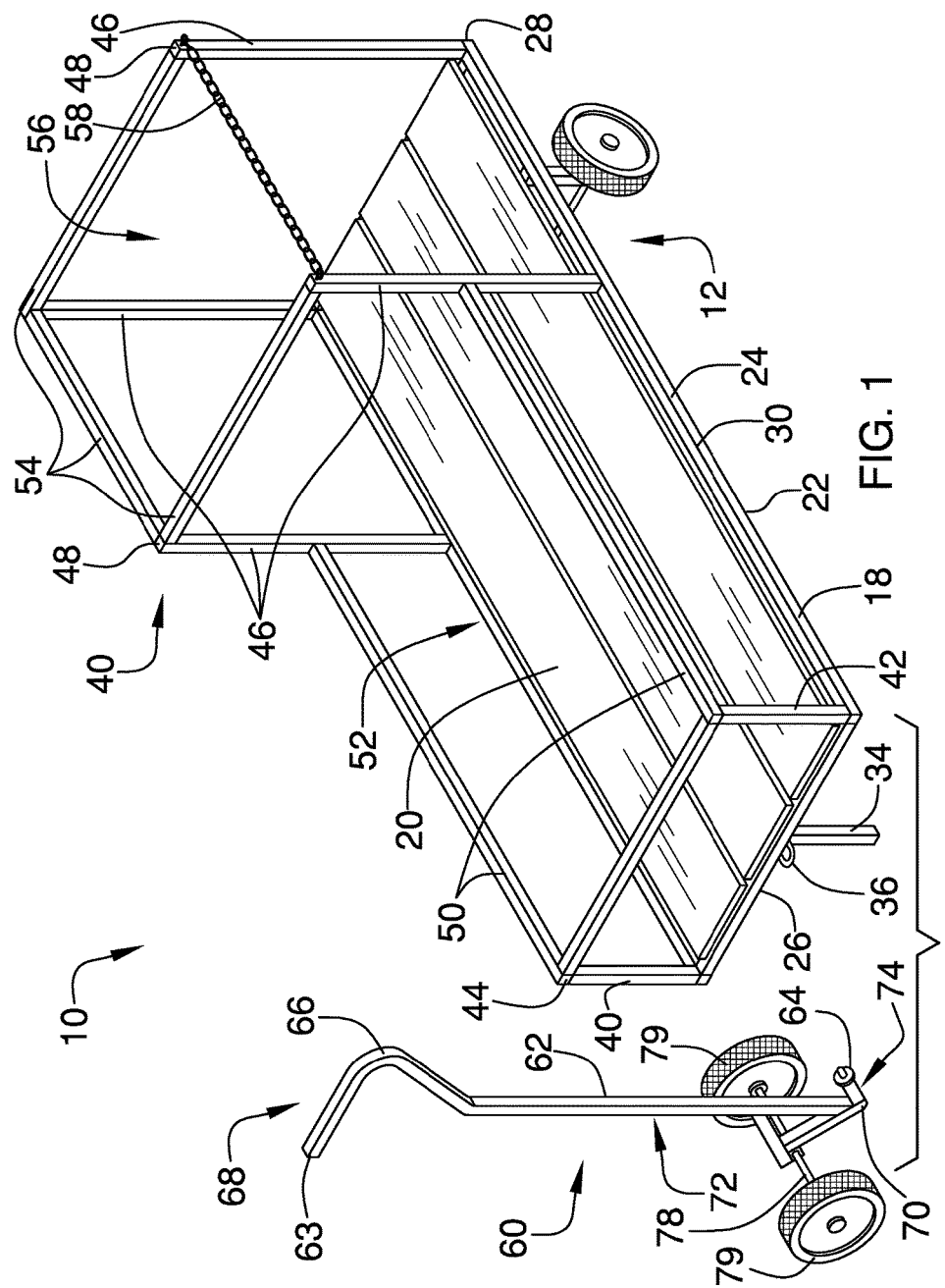
FIG. 1 is a perspective view of a garbage cart assembly according to an embodiment of the disclosure.
Figure 2:
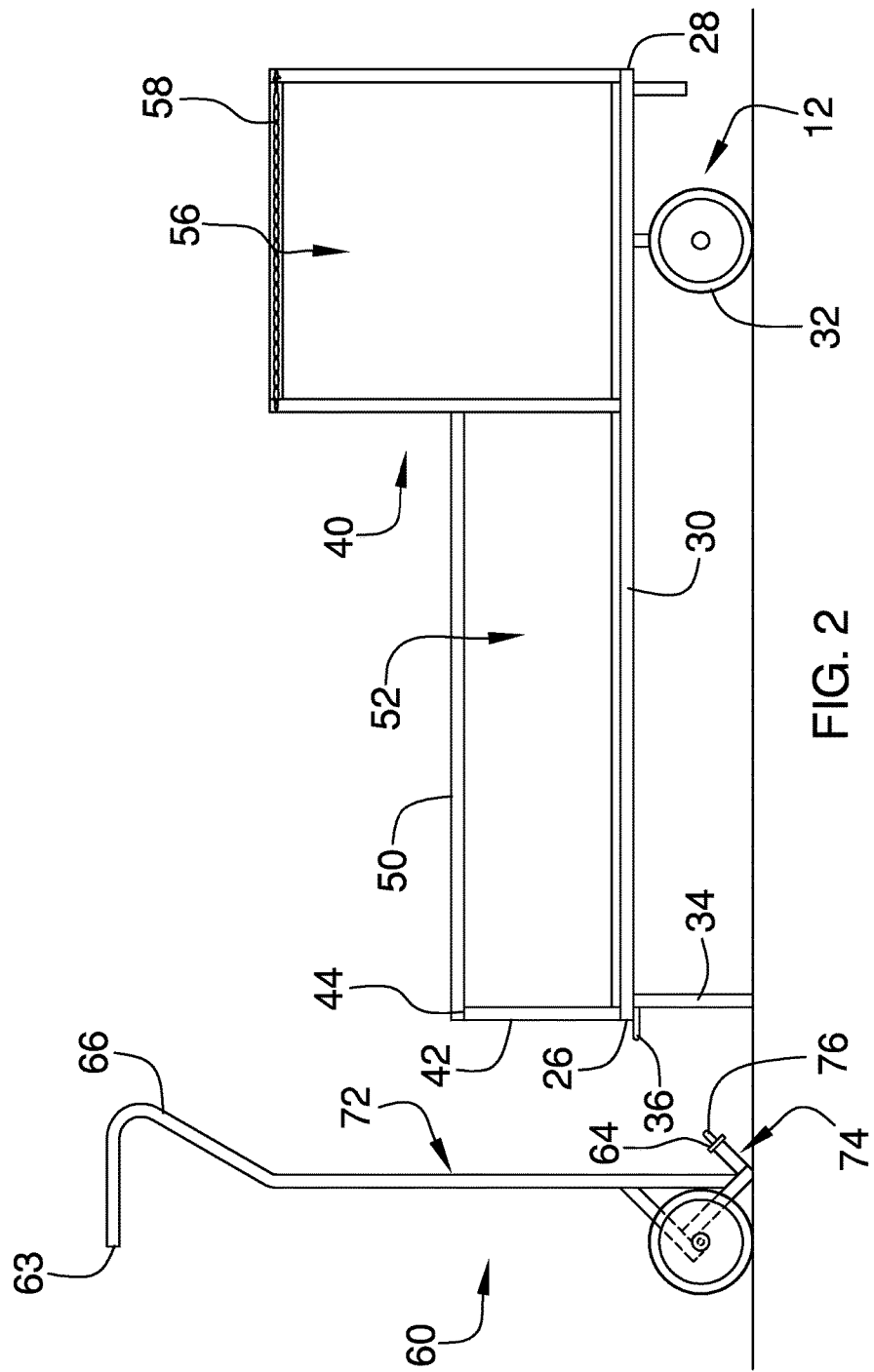
FIG. 2 is a left side view of an embodiment of the disclosure.
Figure 3:
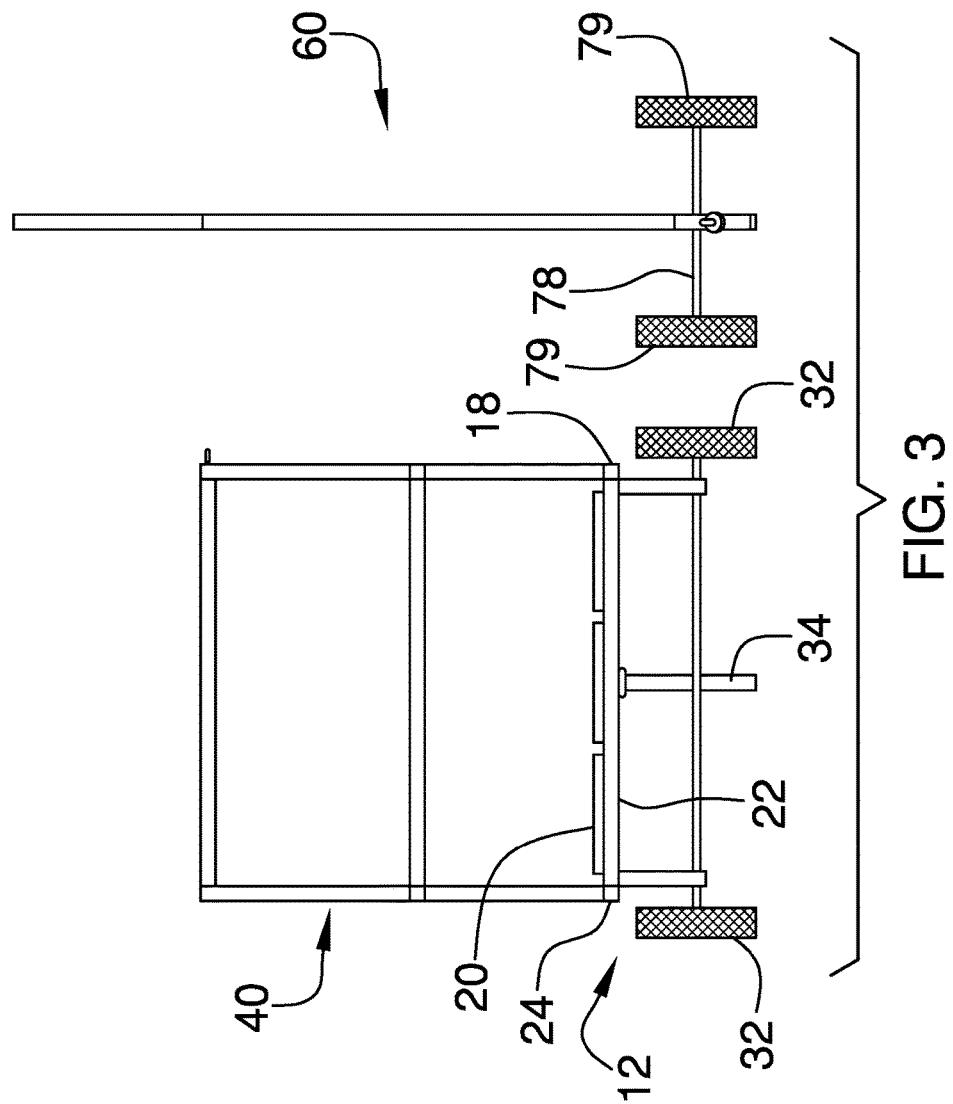
FIG. 3 is a front view of an embodiment of the disclosure.
Figure 4:
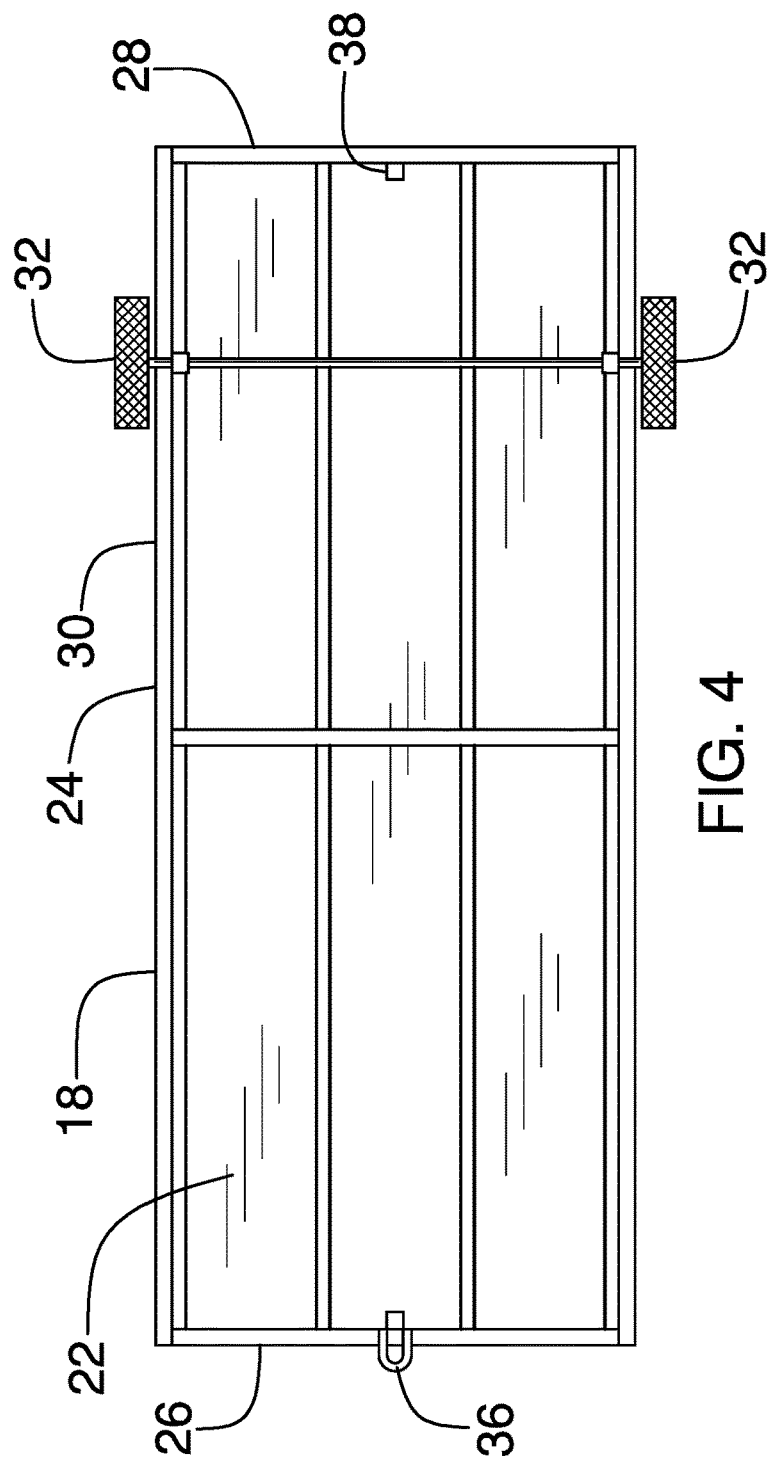
FIG. 4 is a bottom view of an embodiment of the disclosure.
Figure 5:
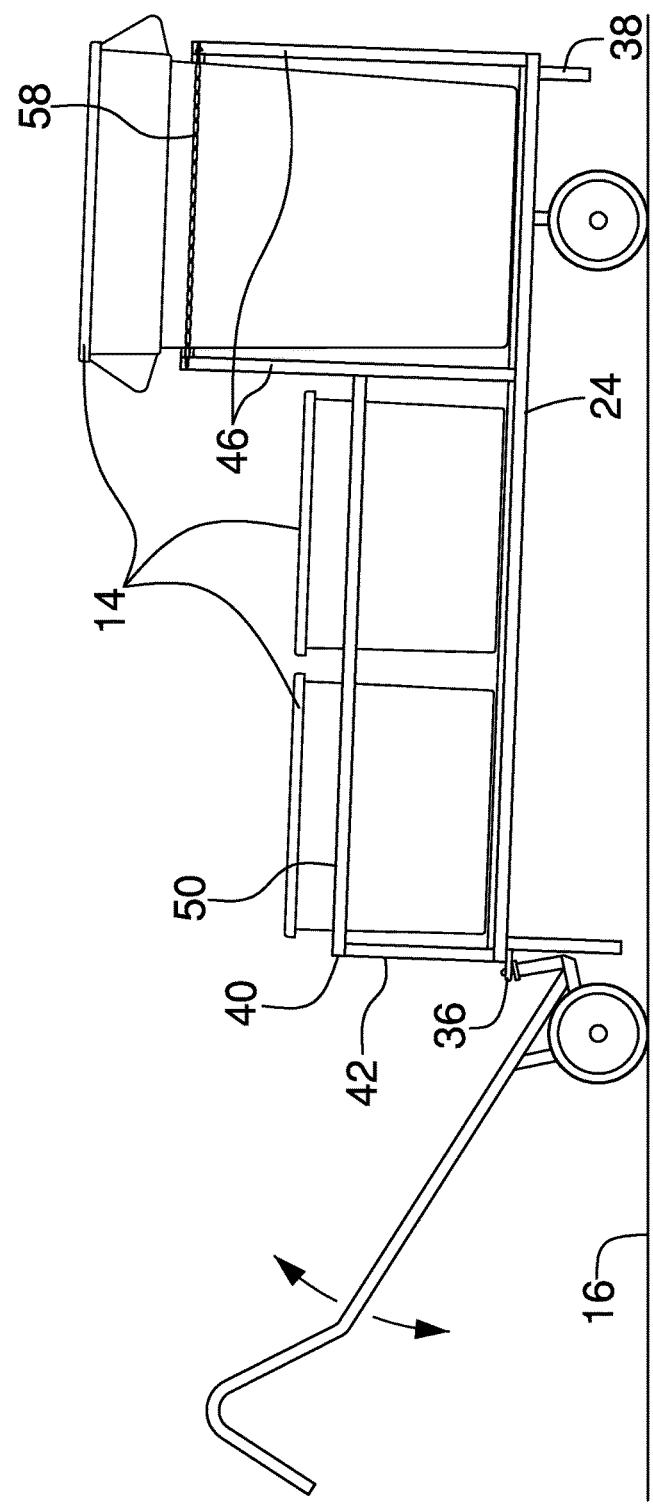
FIG. 5 is a perspective in-use view of an embodiment of the disclosure.

With reference now to the drawings, and in particular to FIGS. 1 through 5 thereof, a new cart device embodying the principles and concepts of an embodiment of the disclosure and generally designated by the reference numeral 10 will be described.

As best illustrated in FIGS. 1 through 5, the garbage cart assembly 10 generally comprises a cart 12 that may have a plurality of garbage containers 14 thereon. The cart 12 is rolled along a support surface 16 thereby facilitating the plurality of garbage containers 14 to be transported along the support surface 16. The garbage containers 14 may be plastic garbage containers or the like that are provided by a waste collection company. Additionally, the cart 12 is selectively positioned along a curb or the like. In this way each of the garbage containers 14 is accessible to a garbage truck or the like when the waste company arrives to empty the garbage containers 14. Moreover, the cart 12 facilitates each of the garbage containers 14 to be simultaneously transported.

The cart 12 includes a deck 18 has a top side 20, a bottom side 22 and a perimeter edge 24 extending therebetween. The perimeter edge 24 has a front side 26, a back side 28 and a first lateral side 30 and the plurality of garbage containers 14 are positioned on the top side 20 of the deck 18. A pair of first wheels 32 is provided and each of the first wheels 32 is rotatably coupled to the bottom side 22 of the deck 18 to roll along the support surface 16. Each of the first wheels 32 is positioned closer to the back side 28 than the front side 26 of the cart 12. The deck 18 may have a length ranging between approximately 127.0 cm and 152.0 cm and a width ranging between approximately 50.0 cm and 65.0 cm. Additionally, the deck 18 may be comprised of a plurality of planks thereby facilitating fluid to drain through the deck 18. Additionally, the planks may be mounted on a rectangular frame.

A leg 34 is coupled to and extends downwardly from the bottom side 22 of the deck 18 and abuts the support surface 16 when the cart 12 is stationary. A hitch 36 is coupled to and extends away from the front side 26 of the deck 18 and the hitch 36 may comprise a closed ring. A rod 38 is slidably coupled to the cart 12 and the rod 38 is selectively manipulated between a retracted position and a deployed position. The rod 38 is vertically oriented on the cart 12 and the rod 38 is positioned on the back side 28 of the deck 18. The rod 38 penetrates the support surface 16 when the rod 38 is positioned in the deployed position thereby inhibiting the cart 12 from rolling on the support surface 16.

A cage 40 is coupled to the cart 12 and the cage 40 inhibits the plurality of garbage containers 14 from falling off of the cart 12. The cage 40 comprises a pair of first members 42 and each of the first members 42 is coupled to and extends upwardly from the top side 20 of the deck 18. Each of the first members 42 has a distal end 44 with respect to the deck 18 and the first members 42 are spaced apart from each other and are distributed along the front side 26 of the deck 18. A plurality of second members 46 is provided and each of the second members 46 is coupled to and extends upwardly from the top side 20 of the deck 18. Each of the second members 46 has a distal end 48 with respect to the deck 18 and the second members 46 are spaced apart from each other and are distributed around the perimeter edge 24 of the deck 18. Thus, each of the second members 46 defines an associated one of four corners of a rectangle extending from the back side 28 of the deck 18 toward the front side 26 of the deck 18. Each of the second members 46 has a height that is greater than a height of the plurality of first members 42.

A pair of third members 50 is provided and each of the third members 50 is coupled between the distal end 44 corresponding to an associated one of the first members 42 and an associated one of the second members 46. In this way the third members 50 define a first compartment 52 on the deck 18. Selected ones of the garbage containers 14 are selectively positioned in the first compartment 52. Each of the third members 50 is horizontally oriented on the cart 12 to inhibit the selected garbage containers 14 from falling out of the first compartment 52. The garbage containers 14 positioned in the first compartment 52 may be recycling bins or the like.

A plurality of fourth members 54 is provided and each of the fourth members 54 is coupled between the distal end 48 corresponding to an associated pair of the second members 46. In this way the fourth members 54 define a second compartment 56 on the deck 18. A selected one of the garbage containers 14 is selectively positioned in the second compartment 56. Each of the fourth members 54 is horizontally oriented on the cart 12 to inhibit the selected garbage container 14 from falling out of the second compartment 56. The garbage container 14 positioned in the second compartment 56 may be a plastic garbage container having a capacity ranging between approximately 30.0 gallons and 50.0 gallons.

A chain 58 is removably coupled to the distal end 44 corresponding to the second members 46 that are positioned on the first lateral side 30 of the deck 18. Thus, the chain 58 inhibits the selected garbage container 14 from falling out of the second compartment 56. The chain 58 is selectively removed from the corresponding second members 46. In this way the selected garbage container 14 may be removed from the second compartment 56.

A dolly 60 is provided and the dolly 60 is selectively rolled along the support surface 16. The dolly 60 is selectively and removably coupled to the cart 12 thereby facilitating the cart 12 to be urged along the support surface 16. The dolly 60 comprises a handle 62 that has a first end 63 and a second end 64. The handle 62 has a curve 66 thereon to define a grip 68 on the handle 62 and the curve 66 is positioned closer to the first end 63 than the second end 64.

The handle 62 has a bend 70 thereon to define a first section 72 forming an angle with respect to a second section 74 of the handle 62. The bend 70 is positioned closer to the second end 64 that the first end having the second end 64 being spaced from the second section 74 of the handle 62. A pin 76 is coupled to the second end 64 of the handle 62. An axle 78 is coupled to the handle 62 and the axle 78 is oriented perpendicular to the axle 78. Moreover, the axle 78 is aligned with the bend 70 on the axle 78 such that the axle 78 defines a fulcrum on the dolly 60.

A pair of second wheels 79 is provided and each of the second wheels 79 is rotatably coupled to the axle 78 to roll along the support surface 16 when the handle 62 is manipulated. The pin 76 is raised upwardly to selectively engage the hitch 36 when the handle 62 is manipulated to rotate downwardly on the axle 78. In this way the dolly 60 supports the cart 12 and the leg 34 on the cart 12 is lifted from the support surface 16. The pin 76 selectively disengages the hitch 36 when the handle 62 is manipulated to rotate upwardly on the axle 78. Thus, the leg 34 on the cart 12 abuts the support surface 16 to retain the deck 18 in a substantially horizontal orientation.

In use, each of the garbage containers 14 is positioned on the cart 12 for depositing garbage and recycling in the garbage containers 14. The dolly 60 is selectively manipulated to engage the cart 12 thereby facilitating the cart 12 to be rolled to a garbage pick-up point such as a curb or the like. In this way the plurality of garbage containers 14 are simultaneously positioned to be emptied by the waste collection company or the like. The chain 58 is removed from the cart 12 and the cart 12 is oriented such that the first lateral side 30 of the deck 18 faces the curb. Thus, the waste collection company may remove the garbage container 14 from the second compartment 56 with a robotic arm on a garbage truck or the like. Additionally, the rod 38 is selectively manipulated into the deployed position to inhibit the cart 12 from being stolen or tampered with.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A garbage cart assembly being configured to transport a plurality of garbage containers to and from a drop-off, said assembly comprising:

a cart being configured to have a plurality of garbage containers thereon, said cart being configured to be rolled along a support surface thereby facilitating the plurality of garbage containers to be transported along the support surface, said cart comprising a deck having a top side, a bottom side and a perimeter edge extending therebetween, said perimeter edge having a front side, a back side, and a first lateral side, said top side being configured to have the plurality of garbage containers positioned thereon; and a pair of first wheels, each of said first wheels being rotatably coupled to said bottom side of said deck wherein each of said first wheels is configured to roll along the support surface, each of said first wheels being positioned closer to said back side than said front side of said cart;

a cage being coupled to said cart wherein said cage is configured to inhibit the plurality of garbage containers from falling off of said cart, said cage comprising a pair of first members, each of said first members being coupled to and extending upwardly from said top side of said deck, each of said first members having a distal end with respect to said deck, a plurality of second members, each of said second members being coupled to and extending upwardly from said top side of said deck, each of said second members having a distal end with respect to said deck, a chain being removably coupled to said distal end corresponding to said second members being positioned on said first lateral side of said deck wherein said chain is configured to inhibit the selected garbage can from falling from said second compartment, said chain being selectively removed from said corresponding second members wherein said chain is configured to facilitate the selected garbage can to be removed from said second compartment; and a dolly being configured to be rolled along the support surface, said dolly being selectively and removably coupled to said cart thereby facilitating said cart to be urged along the support surface.

2. The assembly according to claim 1, further comprising a leg being coupled to and extending downwardly from said bottom side of said deck wherein said leg is configured to abut the support surface when said cart is stationary.

3. The assembly according to claim 1, further comprising a hitch being coupled to and extending away from said front side of said deck.

4. The assembly according to claim 1, further comprising said first members being spaced apart from each other and being distributed along said front side of said deck.

5. The assembly according to claim 1, further comprising said second members being spaced apart from each other and being distributed around said perimeter edge of said deck such that each of said second members defines an associated one of four corners of a rectangle extending from said back side of said deck toward said front side of said deck.

6. The assembly according to claim 1, further comprising a pair of third members, each of said third members being coupled between said distal end corresponding to an associated one of said first members and an associated one of said second members to define a first compartment on said deck wherein said first compartment is configured to have selected ones of the garbage cans positioned therein, each of said third members being horizontally oriented on said cart wherein each of said third members is configured to inhibit the selected garbage cans from falling out of said first compartment.

7. The assembly according to claim 6, further comprising a plurality of fourth members, each of said fourth members being coupled between said distal end corresponding to an associated pair of said second members such that said fourth members defines a second compartment on said deck wherein said second compartment is configured to have a selected one of the garbage cans positioned therein, each of said fourth members being horizontally oriented on said cart wherein each of said fourth members is configured to inhibit the selected garbage can from falling out of said second compartment.

8. The assembly according to claim 1, wherein said dolly comprises a handle being configured to be manipulated, said handle having a first end and a second end, said handle having a curve thereon to define a grip on said handle, said handle having a bend thereon to define a first section and a second section of said handle, said bend being positioned closer to said second end that said first end having said second end being spaced from said second section of said handle.

9. The assembly according to claim 8, further comprising a pin being coupled to said second end of said handle.

10. The assembly according to claim 8, further comprising an axle being coupled to said handle having said axle being oriented perpendicular to said axle, said axle being aligned with said bend on said handle.

11. The assembly according to claim 10, further comprising:

a pin being coupled to said second end of said handle;

a hitch being coupled to said cart; and a pair of second wheels, each of said second wheels being rotatably coupled to said axle wherein each of said second wheels is configured to be rolled along the support surface when said handle is manipulated, said pin selectively engaging said hitch when said handle is manipulated thereby facilitating said dolly to support said cart wherein said leg on said cart is configured to be lifted from the support surface, said pin selectively disengaging said hitch when said handle is manipulated wherein said leg on said cart is configured to abut the support surface.

12. A garbage cart assembly being configured to transport a plurality of garbage containers to and from a drop-off, said assembly comprising:

a cart being configured to have a plurality of garbage containers thereon, said cart being configured to be rolled along a support surface thereby facilitating the plurality of garbage containers to be transported along the support surface, said cart including a deck having a top side, a bottom side and a perimeter edge extending therebetween, said perimeter edge having a front side, a back side, and a first lateral side, said top side being configured to have the plurality of garbage containers positioned thereon;

a pair of first wheels, each of said first wheels being rotatably coupled to said bottom side of said deck wherein each of said first wheels is configured to roll along the support surface, each of said first wheels being positioned closer to said back side than said front side of said cart;

a leg being coupled to and extending downwardly from said bottom side of said deck wherein said leg is configured to abut the support surface when said cart is stationary;

a hitch being coupled to and extending away from said front side of said deck;

a cage being coupled to said cart wherein said cage is configured to inhibit the plurality of garbage containers from falling off of said cart, said cage comprising:

a pair of first members, each of said first members being coupled to and extending upwardly from said top side of said deck, each of said first members having a distal end with respect to said deck, said first members being spaced apart from each other and being distributed along said front side of said deck, a plurality of second members, each of said second members being coupled to and extending upwardly from said top side of said deck, each of said second members having a distal end with respect to said deck, said second members being spaced apart from each other and being distributed around said perimeter edge of said deck such that each of said second members defines an associated one of four corners of a rectangle extending from said back side of said deck toward said front side of said deck, a pair of third members, each of said third members being coupled between said distal end corresponding to an associated one of said first members and an associated one of said second members to define a first compartment on said deck wherein said first compartment is configured to have selected ones of the garbage cans positioned therein, each of said third members being horizontally oriented on said cart wherein each of said third members is configured to inhibit the selected garbage cans from falling out of said first compartment, a plurality of fourth members, each of said fourth members being coupled between said distal end corresponding to an associated pair of said second members such that said fourth members defines a second compartment on said deck wherein said second compartment is configured to have a selected one of the garbage cans positioned therein, each of said fourth members being horizontally oriented on said cart wherein each of said fourth members is configured to inhibit the selected garbage can from falling out of said second compartment, and a chain being removably coupled to said distal end corresponding to said second members being positioned on said first lateral side of said deck wherein said chain is configured to inhibit the selected garbage can from falling from said second compartment, said chain being selectively removed from said corresponding second members wherein said chain is configured to facilitate the selected garbage can to be removed from said second compartment; and a dolly being configured to be rolled along the support surface, said dolly being selectively and removably coupled to said cart thereby facilitating said cart to be urged along the support surface, said dolly comprising:

a handle being configured to be manipulated, said handle having a first end and a second end, said handle having a curve thereon to define a grip on said handle, said handle having a bend thereon to define a first section and a second section of said handle, said bend being positioned closer to said second end that said first end having said second end being spaced from said second section of said handle, a pin being coupled to said second end of said handle, an axle being coupled to said handle having said axle being oriented perpendicular to said axle, said axle being aligned with said bend on said axle, and a pair of second wheels, each of said second wheels being rotatably coupled to said axle wherein each of said second wheels is configured to be rolled along the support surface when said handle is manipulated, said pin selectively engaging said hitch when said handle is manipulated thereby facilitating said dolly to support said cart wherein said leg on said cart is configured to be lifted from the support surface, said pin selectively disengaging said hitch when said handle is manipulated wherein said leg on said cart is configured to abut the support surface.

\* \* \* \* \*